March 3, 1942.   A. W. GRIEPENSTROH   2,274,688
SHOCK ABSORBER
Filed July 15, 1940
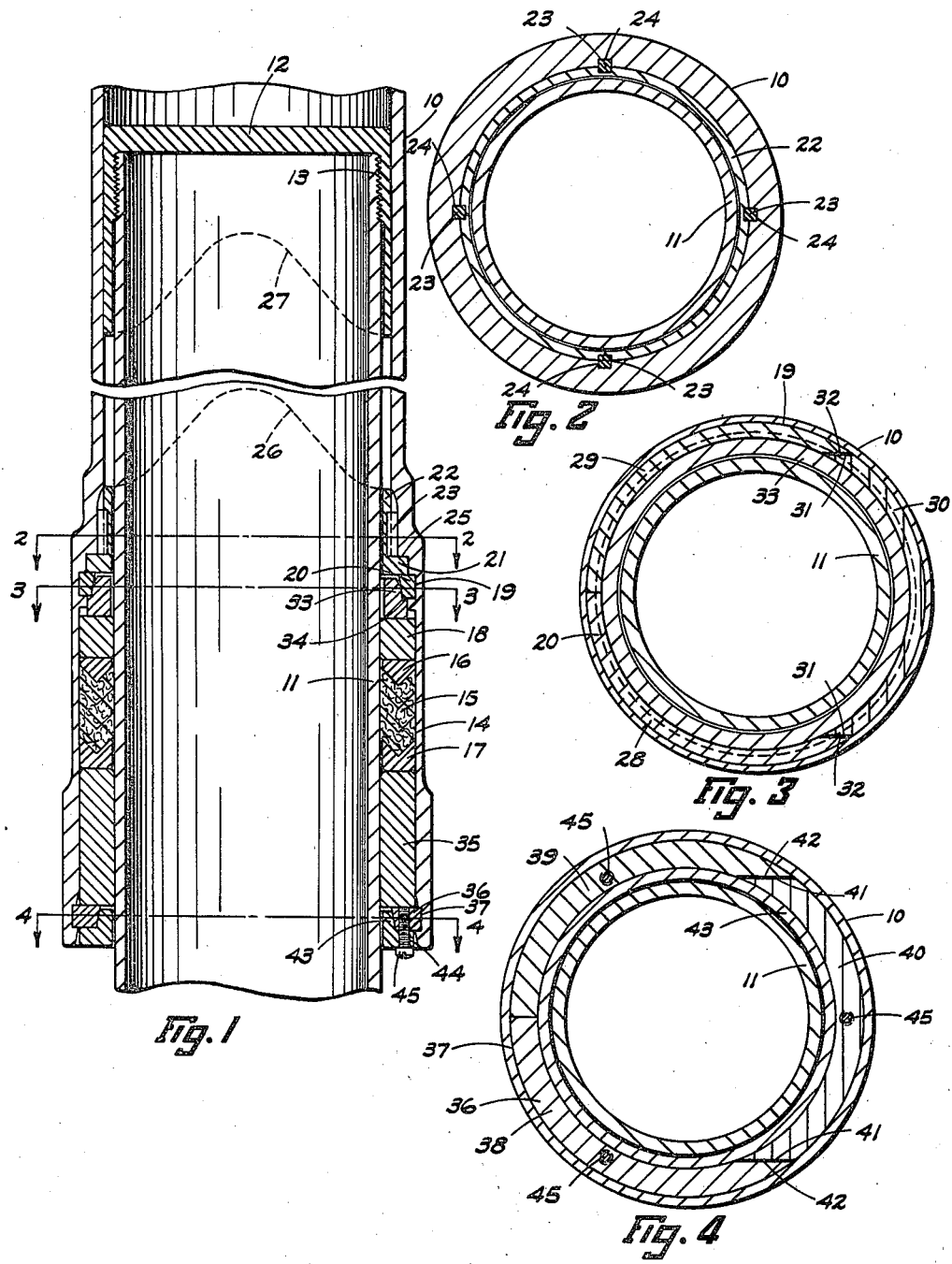
INVENTOR
ARTHUR W. GRIEPENSTROH
BY
ATTORNEY Patented Mar. 3, 1942

2,274,688

UNITED STATES PATENT OFFICE 2,274,688

SHOCK ABSORBER

Arthur W. Griepenstroh, Garfield Heights, Ohio, assignor to The Cleveland Pneumatic Tool Company, Cleveland, Ohio, a corporation of Ohio Application July 15, 1940, Serial No. 345,513

2 Claims. (Cl. 286—31)

This invention relates broadly to a shock absorbing strut for airplanes, but more particularly to improvements in the stuffing-box construction thereof.

One object of this invention is to produce an improved shock absorber wherein the component parts of its stuffing-box are arranged and disposed in a simple and efficient manner eliminating the use of screw threads, and consequently enabling a reduction in the wall thickness of at least one of its cylinders.

Another object of this invention is to provide such shock absorbing strut with a stuffing-box having its component parts entirely located in the interior of the outer cylinder, thereby enabling the outer surface of that cylinder to be smooth for reducing its air resistance to a minimum.

Another object of this invention is to produce a shock absorbing strut with an improved stuffing-box having the parts thereof arranged and disposed in a manner making them readily removable without necessitating the use of special tools.

Other objects and advantages more or less ancillary to the foregoing reside in the specific construction and aggroupment of the elements peculiar to this structure, as will become apparent from a more complete examination of this specification.

In the drawing:

Fig. 1 is a fragmental longitudinal sectional view illustrating a portion of a shock absorbing strut embodying the invention.

Fig. 2 is a cross sectional view of the strut taken in a plane indicated by line 2—2 in Fig. 1.

Fig. 3 is a view similar to Fig. 2, but taken in a plane indicated by line 3—3 in Fig. 1.

Fig. 4 is a view similar to Fig. 2, but taken in a plane indicated by line 4—4 in Fig. 1.

Referring to the drawing, 10 represents the outer cylinder of a shock absorbing strut having slidable therein an inner cylinder 11 closed at its inner end by a piston head 12 screwed in position as at 13. This piston head 12 extends partway between the two cylinders and acts as a sliding bearing therebetween.

The inner end portion of the outer cylinder 10 is enlarged to form a relatively deep counterbore 14 accommodating therein a stuffing-box including annular packing members 15 and packing followers 16 and 17. Resting on the follower 16, there is a bearing sleeve 18 closely fitted between the two cylinders. Near its bottom 25, the counterbore 14 is provided with a circular groove 19 in which there is mounted a sectional retaining ring 20. On this ring rests the external annular flange 21 of a centering member 22, which member extends partway between the two cylinders and is located against rotation relative to the cylinder 10 by one or more keys 23 carried by the member 22 and fitted within suitable keyways 24 provided in the wall of the cylinder 10. The flange 21 of the member 22 is made to fit closely between the ring 20 and the bottom 25 of the counterbore 14, thereby preventing lengthwise movement of the centering member 22 relative to the cylinder 10. The innermost end wall of the member 22 is accurately shaped in a developed helical cam 26 operatively engageable with a similar cam 27 formed on the adjacent end of the piston head 12, which cams, near the end of the extension strokes of the two cylinders, are adapted to engage each other for effecting relative rotation of the cylinders into a predetermined aligned position.

The ring 20 located within the circular groove 19 is formed of three sections 28, 29 and 30, which when located within the groove 19, together form the substantially uninterrupted ring 20 projecting radially from the groove 19 inwardly into the counterbore 14. The inner wall of the ring 20 is radially spaced from the inner cylinder 11 a distance greater than the depth of the groove 19. To enable removal of the ring from the groove 19, one of the sections thereof, in this instance section 30, is shorter than the inner diameter of the ring and has its ends 31 parallel to each other and also parallel to the adjacent ends 32 of the other sections 28 and 29, thereby enabling radial movement of section 30 relative to sections 28 and 29. Resting on the bearing 18, there is a one piece bushing 33 formed with an annular external shoulder 34 resting against the sectional ring 20. The bushing 33 extends part way into the sectional ring 20 in operative engagement with the inner wall of the sections thereof for normally preventing inward movement of the sections out of the groove 19. If desired, the inner wall of the ring 20 and the external wall of the bushing 33 may be inwardly tapered, thereby causing the bushing to act as a wedge to assure engagement of the sections of the ring with the bottom of the groove 19.

Below the packing follower 17, there is another bearing sleeve 35 active between the two cylinders 10 and 11. Below this last bearing near the open end of the counterbore 14, there is provided another circular groove 37 within which is mounted a sectional ring 36. Like the ring 20, the ring 36 includes three sections 38, 39 and 40, which form together, when located in the groove 37, the substantially uninterrupted ring 36. One of the sections of this last ring, in this instance section 40, is also shorter than the inside diameter of the ring and has its ends 41 parallel to each other and to the adjacent ends 42 of the other sections 38 and 39, thereby enabling radial movement of the sections 40 relative to the sections 38 and 39. The inner wall of the ring 36 is also spaced from the inner cylinder 11 a distance greater than the depth of the groove 37. Extending partway into the ring 36, there is a bushing 43 formed with an external annular flange 44 abutting against the ring 36 and secured to each of the sections thereof by cup screws 45. If desired, the inner wall of the ring 36 and the wall of the bushing's portion insertable into the ring may be inwardly tapered, thereby causing the bushing to act as a wedge for urging the sections of the ring 36 into engagement with the bottom of the groove 37.

In practice, parts located within the counterbore 14 are assembled therein by first positioning the centering member 22 as shown in Fig. 1. Subsequently, the sections 28 and 29 of the ring 20 are dropped on the annular flange 21 of the centering member 22 and inserted into the circular groove 19. Subsequently, the short section 30 is slid on the inner cylinder 10 into position between the two sections 28 and 29 and then introduced into the circular groove 19 to form with the sections 28 and 29 the substantially uninterrupted ring 20. Once in the groove 19, the section 30 acts as a locking member preventing inward movement of its companion sections 28 and 29. In order to prevent the inward movement of the section 30, the bushing 33 is subsequently dropped into position for operating engagement with the inner wall of the ring 20 and more particularly of the section 30 thereof, the outside diameter of the bushing 33 being about equal to the inner diameter of the ring 20 when located within the circular groove 19.

After the parts 15 to 18 and 35 have been dropped into the counterbore 14, the ring 36 is then mounted within the circular groove 37 in the manner above described in connection with the ring 20, and the bushing 43 secured in operative position by the cap screws 45 carried by the sections 28, 29 and 30 of the ring 36.

From the foregoing description, it will be understood that the centering member 22 against which the piston head 12 is adapted to rest for limiting the extension stroke of the two cylinders, is actually carried by the sectional ring 20 mounted in the circular groove 19 above the packing members 15, thereby preventing the axial pressure exerted on the centering member 22 by the inner cylinder 11, to be transmitted to the packing members 15, which axial pressure has been found to increase frictional resistance of the packing members on the inner cylinder as well as causing premature wear of the packing members.

It will also be understood that the distance between the two retaining rings 20 and 36 relative to the combined height of the superposed parts located therebetween, is calculated to subject the packing members 15 to sufficient compression for effecting their fluid tight engagement with the two cylinders 10 and 11, and that accidental removal of these superposed parts through the open end of the counterbore 14 is prevented by the removable sectional retaining ring 36.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. In a device of the character described, a pair of telescoping cylinders, an internal circular groove within the outer cylinder, a plurality of ring sections individually insertable between said cylinders into said groove to form a substantially uninterrupted ring radially projecting from said groove inwardly toward the inner cylinder and capable of resisting axial pressure in either direction to which the ring may be subjected, a removable retainer ring insertable between said cylinders into the sectional ring for preventing radial inward movement of said sections, and means detachably securing said retainer ring to at least one of said sections.

2. In a device of the character described, a pair of telescoping cylinders, an internal circular groove within the outer cylinder, a plurality of ring sections individually insertable from one end of the outer cylinder into said groove to form a substantially uninterrupted ring radially projecting from said groove inwardly toward the inner cylinder, a retainer ring insertable from said one end of the outer cylinder into the sectional ring for preventing radial inward movement of said sections, and means detachably securing said retainer ring to at least one of said sections.

ARTHUR W. GRIEPENSTROH.